(12) United States Patent
Lopes et al.

(10) Patent No.: US 9,591,608 B2
(45) Date of Patent: Mar. 7, 2017

(54) METHODS AND SYSTEMS FOR DISCOVERY OF HOME NODE B GATEWAY SUPPORT OF POSITIONING

(71) Applicant: QUALCOMM Incorporated, San Diego, CA (US)

(72) Inventors: Luis Fernando Brisson Lopes, Swindon (GB); Stephen William Edge, Escondido, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/609,321

(22) Filed: Jan. 29, 2015

(65) Prior Publication Data

US 2015/0223191 A1 Aug. 6, 2015

Related U.S. Application Data

(60) Provisional application No. 61/934,688, filed on Jan. 31, 2014.

(51) Int. Cl.
*H04W 24/00* (2009.01)
*H04W 64/00* (2009.01)
(Continued)

(52) U.S. Cl.
CPC ........... *H04W 64/003* (2013.01); *H04W 4/02* (2013.01); *H04W 64/00* (2013.01); *H04W 84/045* (2013.01); *H04W 92/045* (2013.01)

(58) Field of Classification Search
CPC .... H04W 64/003; H04W 4/02; H04W 84/045
(Continued)

(56) References Cited

U.S. PATENT DOCUMENTS

2009/0265543 A1* 10/2009 Khetawat .............. H04L 63/104
 713/151
2011/0105076 A1* 5/2011 Bot ...................... H04M 3/5116
 455/404.2

(Continued)

FOREIGN PATENT DOCUMENTS

WO WO-2013142361 A1 9/2013

OTHER PUBLICATIONS

3GPP TS 25.470, "3rd Generation Partnership Project, Technical Specification Group Radio Access Network, UTRAN Iuh Interface PCAP User Adaption (PUA) signaling, (Release 12)", 3GPP Standard, 3rd Generation Partnership Project (3GPP), Mobile Competence Centre, 650, Route Des Lucioles, F-06921 Sophia-Antipolis Cedex, France, vol. RAN WG3, No. V1.0.1, Dec. 16, 2013 (Dec. 16, 2013), pp. 1-43, XP050728694, [retrieved on Dec. 16, 2013].

(Continued)

*Primary Examiner* — Shahriar Behnamian
(74) *Attorney, Agent, or Firm* — Berkeley Law & Technology Group, LLP

(57) ABSTRACT

Disclosed are methods and systems for enabling a Home Node B (HNB) to discover the positioning capabilities of an HNB Gateway (HNB GW) in supporting particular positioning operations associated with transporting Positioning Calculation Application Part (PCAP) messages between the HNB and a standalone serving mobile location center (SAS).

53 Claims, 8 Drawing Sheets

(51) Int. Cl.
*H04W 4/02* (2009.01)
*H04W 84/04* (2009.01)
*H04W 92/04* (2009.01)

(58) Field of Classification Search
USPC ......... 455/456.1, 456.2, 456.3, 456.4, 456.5, 455/456.6, 457
See application file for complete search history.

(56) References Cited

U.S. PATENT DOCUMENTS

| | | | | |
|---|---|---|---|---|
| 2011/0122841 | A1* | 5/2011 | Aoyagi | H04W 36/04 370/331 |
| 2012/0064903 | A1* | 3/2012 | Pani | H04W 36/0088 455/450 |
| 2012/0108263 | A1* | 5/2012 | Zhang | G01S 5/0221 455/456.1 |
| 2012/0142353 | A1* | 6/2012 | Jha | H04W 36/0038 455/436 |
| 2014/0274062 | A1* | 9/2014 | Centonza | H04W 24/10 455/437 |
| 2015/0065165 | A1* | 3/2015 | Zhang | G01S 19/48 455/456.1 |

OTHER PUBLICATIONS

Alcatel-Lucent et al., "Stage 2 Changes for PCAP over IUh", 3GPP Draft; R3-131641-CR-25467-PCAP, 3rd Generation Partnership Project (3GPP), Mobile Competence Centre; 658, Route Des Lucioles, F-86921 Sophia-Antipolis Cedex; France, vol. RAN WG3, No. Venice, Italy; Oct. 7, 2013-Oct. 11, 2013 Sep. 27, 2013 (Sep. 27, 2013), XP050719833, Retrieved from the Internet: &It;a href="http://www.3gpp.org/ftp/tsg_ran/WG3_Iu/TSGR3_81bis/Docs/">URL:http://www.3gpp.org/ftp/tsg_ran/WG3_Iu/TSGR3_81bis/Docs/&It;/a> [retrieved on Sep. 27, 2013].

International Search Report and Written Opinion—PCT/US2015/014004—ISA/EPO—May 27, 2015.

* cited by examiner

METHODS AND SYSTEMS FOR DISCOVERY OF HOME NODE B GATEWAY SUPPORT OF POSITIONING

CROSS-REFERENCE TO RELATED APPLICATIONS

This application claims the benefit of U.S. Provisional Application No. 61/934,688, entitled "Methods and Systems for Discovery of Home Node B Gateway Support of Positioning," filed Jan. 31, 2014, which is assigned to the assignee hereof and which is expressly incorporated herein by reference.

BACKGROUND

Field

Embodiments described herein are directed to application of efficient network architectures and message flows among devices to provide a location based service in a venue or other localized area wherein Home Node Bs (HNBs) are deployed.

Information

The global positioning system (GPS) and other like satellite and terrestrial positioning systems have enabled navigation services for mobile handsets in outdoor environments. Likewise, particular techniques for obtaining estimates of positions of mobile device in indoor environments may enable enhanced location based services in particular indoor venues such as residential, governmental or commercial venues.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
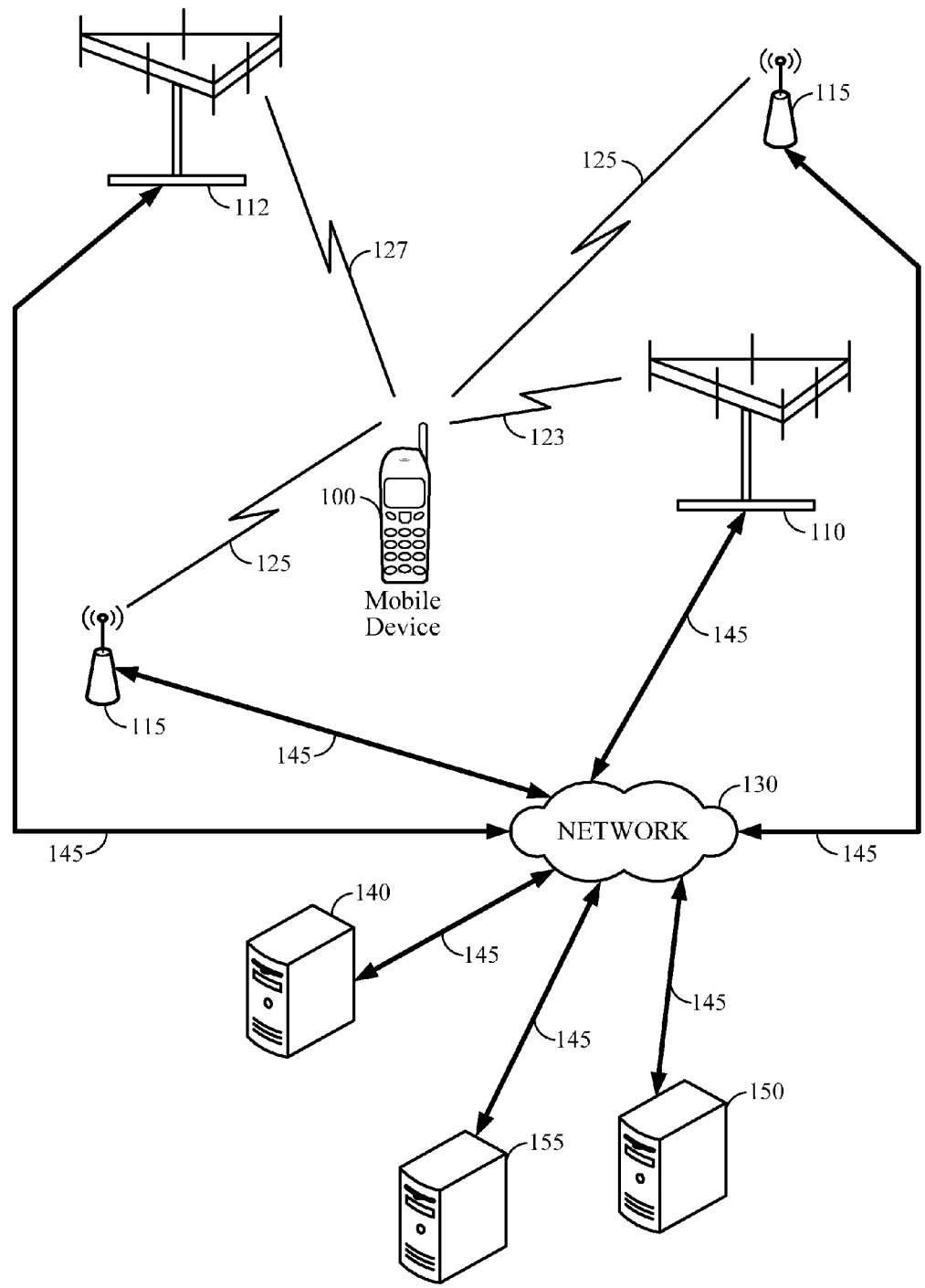
FIG. 1 is a system diagram illustrating certain features of a system containing a mobile device, in accordance with an implementation.

Briefly, particular implementations are directed to a method, at a femtocell transceiver comprising a Home Node B (HNB), comprising: transmitting a first message to an HNB gateway (HNB-GW) comprising one or more parameters requesting support for Positioning Calculation Application Part (PCAP) transport over PCAP User Adaption (PUA); and receiving a second message from the HNB GW in response to the first message indicating whether the HNB-GW is capable of supporting PUA messages Another particular implementation is directed to a femtocell transceiver device configured as a Home Node B (HNB) device, comprising: a network adapter to transmit messages to and receive messages from a data communication network; and one or more processors to: initiate transmission of an first message to an HNB gateway (HNB-GW) comprising one or more parameters requesting support for Positioning Calculation Application Part (PCAP) transport over PCAP User Adaption (PUA); and obtain an second message received at the network adapter from the HNB GW in response to the first message indicating whether the HNB-GW is capable of supporting PUA messages.

Another particular implementation is directed to a femtocell transceiver device configured as a Home Node B (HNB) device, comprising: means for transmitting an first message to an HNB gateway (HNB-GW) comprising one or more parameters requesting support for Positioning Calculation Application Part (PCAP) transport over PCAP User Adaption (PUA); and means for receiving an second message from the HNB GW in response to the first message indicating whether the HNB-GW is capable of supporting PUA messages.

Another particular implementation is directed to a non-transitory storage medium comprising machine-readable instructions stored thereon which are executable by a special purpose computing apparatus of a femtocell transceiver device configured as a Home Node B (HNB) to: initiate transmission of a first message to an HNB gateway (HNB-GW) comprising one or more parameters requesting support for Positioning Calculation Application Part (PCAP) transport over PCAP User Adaption (PUA); and obtain a second message received from the HNB GW in response to the first message indicating whether the HNB-GW is capable of supporting PUA messages.

Another particular implementation is directed to a method, at a Home Node B gateway (HNB-GW), comprising: receiving a first message from a Home Node B (HNB) device comprising one or more parameters requesting support for Positioning Calculation Application Part (PCAP) transport over PCAP User Adaption (PUA); and transmitting a second message to the HNB device in response to the first message comprising one or more parameters indicating whether the HNB-GW is capable of supporting PUA messages.

Another particular implementation is directed to a Home Node B gateway (HNB-GW) device, comprising: a network adapter to transmit messages to and receive messages from a data communication network; and one or more processors to: obtain a first message received at the network adapter from a Home Node B device (HNB) device comprising one or more parameters requesting support for Positioning Calculation Application Part (PCAP) transport over PCAP User Adaption (PUA); and initiate transmission of a second message through the network adapter to the HNB device in response to the first message comprising one or more parameters indicating whether the HNB-GW is capable of supporting PUA messages.

Another particular implementation is directed to a Home Node B gateway (HNB-GW) device, comprising: means for receiving a first message from a Home Node B device (HNB) device comprising one or more parameters requesting support for Positioning Calculation Application Part (PCAP) transport over PCAP User Adaption (PUA); and means for transmitting a second message to the HNB device in response to the first message comprising one or more parameters indicating whether the HNB-GW is capable of supporting PUA messages.

Another particular implementation is directed to a non-transitory storage medium comprising machine-readable instructions stored thereon, which are executable by one or more processors of a Home Node B gateway (HNB-GW) to: obtain a first message received from a Home Node B device (HNB) device comprising one or more parameters requesting support for Positioning Calculation Application Part (PCAP) transport over PCAP User Adaption (PUA); and initiate transmission of a second message to the HNB device in response to the first message comprising one or more parameters indicating whether the HNB-GW is capable of supporting PUA messages.

It should be understood that the aforementioned implementations are merely example implementations, and that claimed subject matter is not necessarily limited to any particular aspect of these example implementations.

DETAILED DESCRIPTION

Deployment of Home Node B (HNB) systems has enabled the expansion of cellular service coverage to areas including indoor areas such as homes, offices and different types of venue (e.g. shopping malls, airports and convention centers). An HNB may provide radio coverage over a small area (e.g. of 50 to 150 meters across) and may serve as a small and potentially portable base station for a particular carrier. An HNB may support wireless service using a radio technology, such as Wideband Code Division Multiple Access (WCDMA), that is part of Universal Mobile Telecommunications System (UMTS). Both UMTS and WCDMA are defined by the $3^{rd}$ Generation Partnership Project (3GPP). An HNB may be deployed by being connected to the infrastructure (e.g., core network) of an associated carrier, through a digital subscriber line (DSL) or cable operator network, and may support exchange of voice and data between a user equipment (UE) device served by the HNB and carrier infrastructure. Positioning support for a UE served by an HNB may be useful to a user of the UE in order to provide location related services (e.g. navigation support, direction finding and other information related to a user's location) and to locate the user when the user makes an emergency call. However, carrier assisted positioning services may not necessarily be available or usable through all deployments of an HNB.

Support of UE positioning can be provided for WCDMA and UMTS access using the 3GPP control plane location solution which is documented in 3GPP Technical Specification (TS) 25.305. In the Universal Terrestrial Radio Access Network (UTRAN) architecture for UE positioning, there is a positioning specific element, the SAS (Standalone Serving Mobile Location Center), which may have different functions related to positioning of mobile devices. These functions may include, for example, (i) provision of assistance data to a User Equipment (UE) (e.g., UE device) to assist a UE to acquire and measure positioning related signals (e.g. GPS satellite signals) and/or to compute its location from positioning measurements, and (ii) support of position calculation for a UE based on positioning measurements provided by the UE.

According to an embodiment, an SAS may communicate with a Radio Network Controller (RNC) over the 3GPP UTRAN Iupc interface enabling the SAS to provide positioning assistance data to UEs via the RNC and an Node B in the UTRAN, and to receive positioning measurement data from UEs via the Node B and RNC. Transfer of such data between the SAS and an RNC may be performed over the Iupc interface using the Positioning Calculation Application Part (PCAP) protocol specified in 3GPP TS 25.453. Also, 3GPP has introduced support for positioning of UEs that are served by an HNB (rather than by an RNC and Node B) which has led to an extension of the 3GPP control plane location solution for UMTS to enable support of the PCAP protocol between an SAS and an HNB, wherein PCAP protocol messages are transported between the SAS and the HNB via a Home Node B gateway (HNB GW). This enables Home Node B (HNB) devices to make use of existing UE positioning support in the SAS to support positioning of UEs served by the HNB devices, without adding to or changing the positioning interface to the SAS (which may remain a single Iupc interface from the SAS to either an HNB GW or RNC). Enabling PCAP messages to be transferred between an SAS and an HNB via an HNB-GW may be realized via a new adaptation (or adaption) protocol, known as "PCAP User Adaption", or PUA, that transports PCAP messages between an HNB and an HNB Gateway, as described in 3GPP TS 25.470, thereby enabling the SAS to treat the HNB GW as an RNC and not be aware (necessarily) that the HNB GW is relaying the PCAP messages (using PUA) to and from an HNB. PUA may be implemented as a protocol overlaid on the 3GPP Iuh interface between an HNB and an HNB-GW as described in 3GPP TS 25.467. Note that herein, a Home Node B gateway may be abbreviated synonymously as either an "HNB GW" or "HNB-GW".

One problem in applying PCAP transport over PUA to an HNB-GW is that an HNB device may not know a-priori whether the HNB-GW that it connects to (e.g. via a DSL or cable network) supports PCAP transport or not. In particular, if an HNB device is first initialized by a user (e.g. following installation at a target location and being powered on), the HNB device may not know whether the HNB-GW, that is assigned by the carrier network during the initialization process for the HNB, is capable of supporting PCAP message transfer to an SAS, and thus whether or not the HNB device may invoke a PCAP session with an SAS to locate a UE. In particular, while the HNB may support positioning of UEs (and possibly positioning of itself) using PCAP support provided by an SAS that may be accessible from the HNB GW, the HNB GW that the HNB connects to may be a legacy device that has not been upgraded to support PCAP message transfer to the HNB or the HNB GW may have been upgraded but may not be connected to an SAS. If an HNB device attempts to instigate a PCAP session via an HNB GW that does not support PCAP transfer or is not connected to an SAS, there may be no response from the HNB GW, possibly leading to failure or delay in supporting positioning of a UE (or positioning of the HNB itself) by the HNB. An HNB device may not be able to infer whether an HNB GW supports PCAP and is connected to an SAS from other signaling exchanges with the HNB GW over the Iuh interface since PUA may be completely separate from and not identified or represented in other protocols used on the Iuh interface. Hence an HNB device may need to assume that an HNB GW may support PCAP and be connected to an SAS and proceed via trial-and-error by sending PCAP and PUA messages that may not be answered by the HNB-GW if the HNB GW does not support PUA (e.g., since there may be no failure message defined on the Iuh interface for a protocol that the HNB-GW does not support). This trial-and-error approach may cause additional traffic on the Iuh interface (e.g. resulting in congestion and delays to other Iuh signaling if an ADSL line with limited bandwidth is used on the Iuh interface) as well as wasting resources involved in UE positioning. For example, due to time spent in unsuccessfully attempting to transfer PCAP messages to an SAS via an HNB-GW that does not support the PUA protocol, valuable time may be lost (e.g., several seconds or more) which may delay any response from an HNB for a location request for a UE received from a core network.

As shown in FIG. 1 in a particular implementation, a mobile device 100, which may also be referred to as a UE, may transmit radio signals to, and receive radio signals from, a wireless communication network. In one example, mobile device 100 may communicate with a cellular communication network by transmitting wireless signals to, or receiving wireless signals from, a femtocell transceiver 110 which may comprise an HNB over wireless communication link 123. Similarly, mobile device 100 may transmit wireless signals to, or receive wireless signals from, local transceiver 115 over wireless communication link 125. Further, mobile device 100 may transmit wireless signals to, or receive wireless signals from, a cellular transceiver 112, which may comprise a base station, Node B or evolved Node B (eNodeB), over wireless communication link 127.

In a particular implementation, a local transceiver 115 may be configured to communicate with mobile device 100 at a similar range over wireless communication link 125 to the range enabled by a femtocell transceiver 110 over wireless communication link 123. For example, both a local transceiver 115 and a femtocell transceiver 110 may be positioned in an indoor environment. A local transceiver 115 may comprise an AP and may provide access to a wireless local area network (WLAN, e.g., IEEE 802.11 network) or wireless personal area network (WPAN, e.g., Bluetooth network). In a particular implementation, cellular transceiver 112 may support a macro cell or pico cell with a larger coverage area than supported by femtocell transceiver 110 and/or local transceiver 115 and may or may not be positioned in an indoor environment. Of course it should be understood that these are merely examples of networks that may communicate with a mobile device over a wireless link, and claimed subject matter is not limited in this respect.

Examples of network technologies that may support wireless communication link 123 and/or wireless communication link 127 are Global System for Mobile Communications (GSM), Code Division Multiple Access (CDMA), Wideband CDMA (WCDMA), Long Term Evolution (LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of UMTS and may be supported by an HNB as previously mentioned. Femtocell transceiver 110 and cellular transceiver 112 may comprise deployments of equipment providing subscriber access (e.g. access to mobile device 100) to a wireless telecommunication network for a service (e.g., under a service contract). Here, a femtocell transceiver 110 may perform functions of a cellular base station (e.g. similar functions to cellular transceiver 112) in servicing subscriber devices within a cell determined based, at least in part, on a range at which the femtocell transceiver 110 is capable of providing access service. In a particular implementation (and as discussed below with a specific example implementation in FIG. 2), a femtocell transceiver 110 may be connected to a carrier network via an Internet service provider (ISP) gateway (e.g., through a cable or DSL modem). Examples of radio technologies that may support wireless communication link 125 are IEEE 802.11 or Bluetooth® (BT).

In a particular implementation, femtocell transceiver 110, local transceiver 115 and cellular transceiver 112 may communicate with servers 140, 150 and/or 155 over a network 130 through links 145. Here, network 130 may comprise any combination of wired or wireless links and may include femtocell transceiver 110, cellular transceiver 112 and/or local transceiver 115 and/or servers 140, 150 and 155. In a particular implementation, network 130 may comprise Internet Protocol (IP) infrastructure capable of facilitating communication between mobile device 100 and servers 140, 150 or 155 through local transceiver 115, cellular transceiver 112 or femtocell transceiver 110. In another implementation, network 130 may comprise cellular communication related network infrastructure such as, for example, a base station controller or packet based or circuit based switching center (not shown) to facilitate mobile cellular communication with mobile device 100. In a particular implementation, network 130 may comprise local area network (LAN) elements such as WiFi APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one implementation, network 130 may include one or more HNB-GWs, one or more RNCs and/or one or more security gateways. In one implementation, one or more of servers 140, 150 and 155 may be an SAS and may connect to one or more HNB-GWs and/or one or more RNCs in network 130.

In particular implementations, and as discussed below, mobile device 100 may have circuitry and processing resources capable of computing a position fix or estimated location of mobile device 100. In the presently illustrated example, mobile device 100 may obtain a position fix by processing signals received from terrestrial transmitters fixed at known locations (e.g., such as femtocell transceiver 110 and/or cellular transceiver 112) using any one of several position methods such as, for example, Advanced Forward Link Trilateration (AFLT), Observed Time Difference Of Arrival (OTDOA) or Enhanced Cell ID (E-CID). In some of these techniques, pseudoranges or timing differences may be measured at mobile device 100 relative to three or more of such terrestrial transmitters fixed at known locations based, at least in part, on pilot or other positioning related signals transmitted by the transmitters and received at mobile device 100. Here, servers 140, 150 or 155 may be capable of providing positioning assistance data to mobile device 100 including, for example, information regarding signals to be measured (e.g., signal timing, signal power) and locations and identities of terrestrial transmitters to facilitate positioning techniques such as AFLT and OTDOA. For example, servers 140, 150 or 155 may comprise an almanac which indicates locations and identities of femtocell transceivers, cellular transceivers and/or local transceivers in a particular region or regions such as a particular venue, and may provide information descriptive of signals transmitted by a femtocell, base station or AP such as transmission power and signal timing. In the case of E-CID positioning, a mobile device 100 may measure the signal strength and/or signal quality (e.g. signal to noise ratio (S/N)) for signals received from femtocell transceiver 110, cellular transceiver 112 and/or local transceiver 115 and/or may measure the round trip signal propagation time (RTT) between the mobile device 100 and each transceiver and may use this information and almanac data received from a server 140, 150 or 155 to determine a location for mobile device 100 or may transfer the information to a server 140, 150 or 155 to perform the same determination.

A mobile device (e.g., mobile device 100 in FIG. 1) may be referred to as a device, a wireless device, a mobile terminal, a terminal, a wireless terminal, a mobile station (MS), a user equipment (UE), a Secure User Plane Location (SUPL) Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, UMTS HRPD, WiFi, BT, WiMax etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. The location of a mobile device (e.g., mobile device 100) may be referred to as a location estimate, position, position fix, location fix or position estimate and may be geographic and thereby provide location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

The network architecture described previously in relation to FIG. 1 may be considered as a generic architecture that can fit a variety of outdoor and indoor location solutions including the standard Secure User Plane Location (SUPL) solution defined by the Open Mobile Alliance (OMA) and 3GPP and 3GPP2 control plane location solutions. For example, server 140, 150 or 155 may function as (i) a SUPL location platform (SLP) to support the SUPL location solution, or (ii) an enhanced Serving Mobile Location Center (E-SMLC) to support the 3GPP control plane location solution with LTE access on wireless communication link 123, 125 or 127, or (iii) a Standalone Serving Mobile Location Center (SAS) to support the 3GPP Control Plane Location solution for UMTS on wireless communication link 123, 125 or 127.

Figure 2:
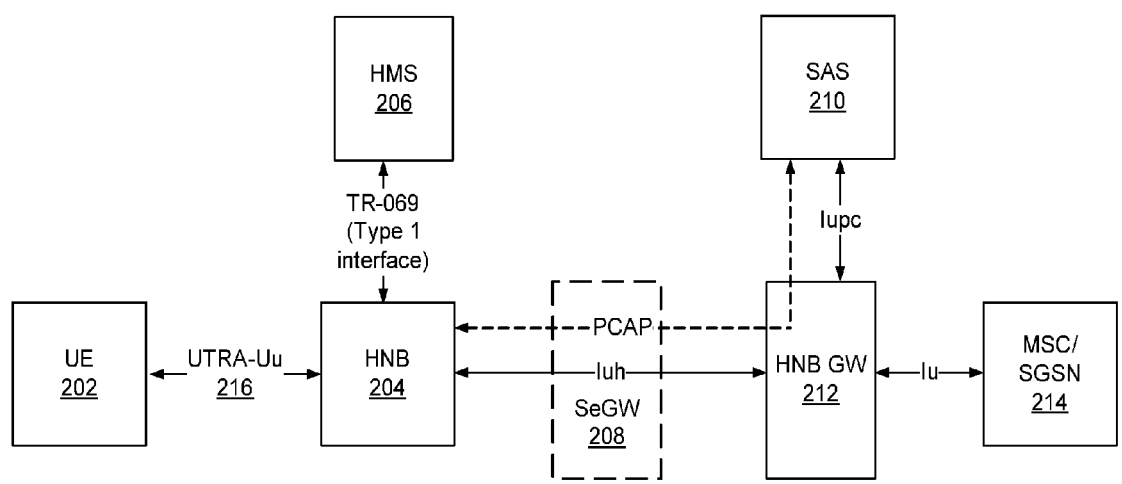
FIG. 2 is a schematic diagram of an integration of a Home Node B (HNB) with a location server according to an embodiment.

FIG. 2 is a schematic diagram of an integration of an HNB with a location server according to an embodiment. UE 202 may communicate with HNB 204 using WCDMA to receive mobile services through a Uu interface 216. Here, HNB 204 may enable communication between UE 202 and SAS 210 (e.g., for positioning services), as well as communication between UE 202 and Mobile Switching Center/Serving General Packet Radio Service (GPRS) Support Node (MSC/SGSN) 214 (e.g., for voice or data services). HNB gateway (HNB GW) 212 may perform at least some functions of an RNC and communicate with MSC/SGSN 214 over an Iu interface and with SAS 210 over an Iupc interface. UE 202, HNB 204, Uu interface 216 and SAS 210 in FIG. 2 may correspond, respectively, in an implementation to mobile device 100, femtocell transceiver 110, wireless communication link 123 and one of servers 140, 150 and 155 in FIG. 1.

On installation and initialization, HNB 204 may communicate with a remote HNB Management System (HMS) 206, possibly via a security gateway (e.g. security gateway (SeGW) 208), to receive configuration parameters including, for example, identities and/or addresses of any HNB GWs such as HNB GW 212. HNB 204 may then communicate with security gateway (SeGW) 208 for access to HNB GW 212. As discussed below in particular embodiments, HNB 204 may then register with HNB GW 212 and determine whether HNB GW 212 supports transport of PCAP messages between SAS 210 and HNB 204.

Figure 3:
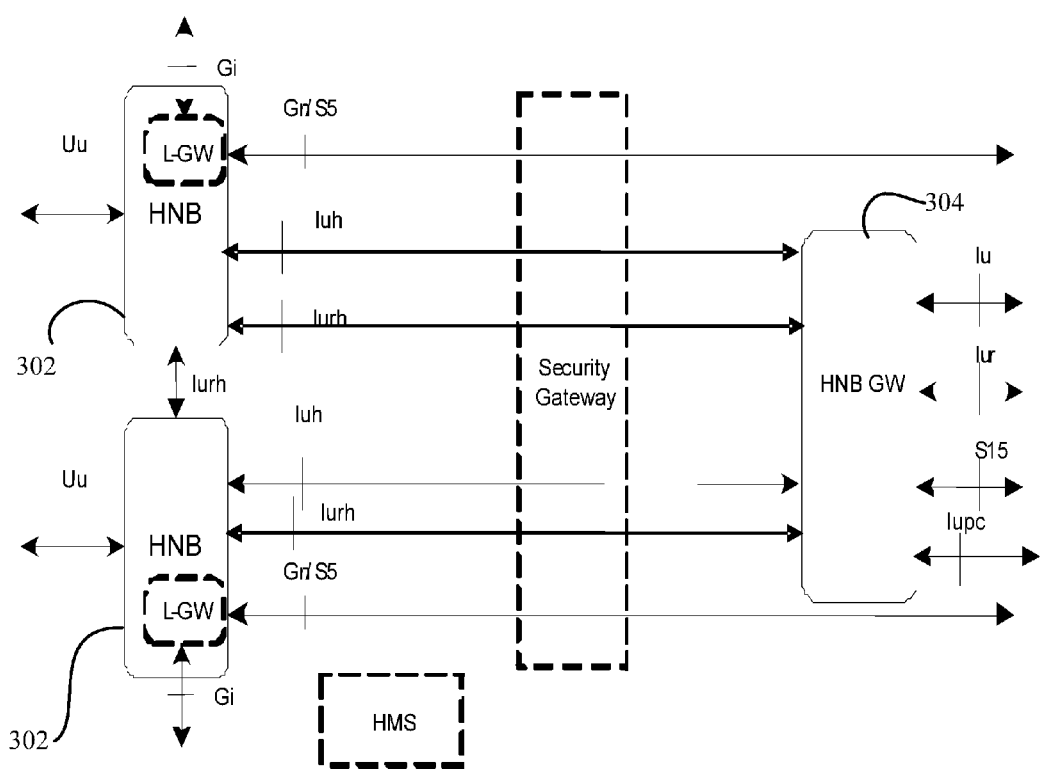
FIG. 3 is a schematic diagram showing communication of an HNB device with an HNB gateway (HNB-GW) through a security gateway, according to an embodiment.

FIG. 3 is a schematic diagram showing communication of HNB devices 302 with an HNB gateway (HNB GW) 304 through a SeGW according to an embodiment. Any of HNB devices 302 and HNB GW 304 in FIG. 3 may correspond, respectively, to HNB 204 and HNB GW 212 in FIG. 2. As discussed above (e.g. in association with FIG. 2), an HNB device 302 may communicate with an SAS through an HNB GW 304 using PCAP messages. These messages are sent from the HNB device 302 to the HNB GW 304 over the Iuh interface using a protocol such as PCAP User Adaption (PUA), and then sent from the HNB GW 304 to an SAS (not shown) using the Iupc interface which may employ the Signaling Connection Control Part (SCCP) protocol for transport of PCAP messages. The PUA protocol may enable the HNB GW 304 to distinguish PCAP messages received from an HNB device 302 or from different HNB devices 302 pertaining to different UE (or HNB) positioning sessions, so that it is able to identify the correct SAS target, and also to associate these messages with the correct context (e.g. correct SCCP connection) for the Iupc interface when forwarding the messages to a particular SAS, without analyzing the contents of each PCAP message.

Figure 4:
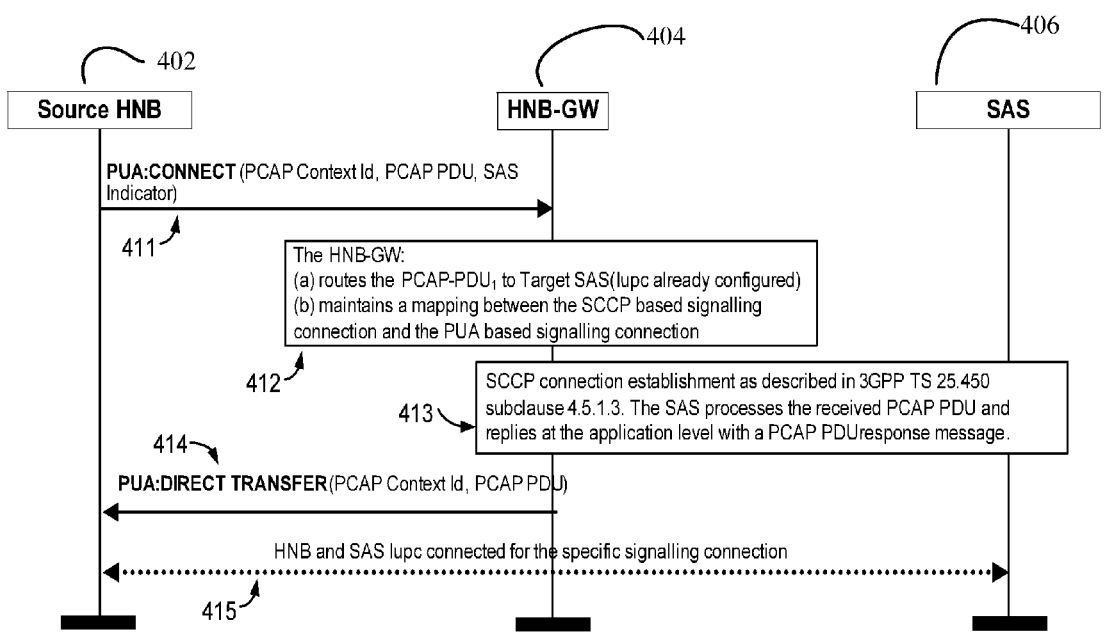
FIG. 4 is a message flow diagram showing an exchange of messages for establishing a signaling session between an HNB device and a standalone serving mobile location center (SAS), according to an embodiment.

An example of a message flow according to an embodiment is shown in FIG. 4. Here, source HNB device 402 may correspond to femtocell transceiver 110 in FIG. 1, HNB 204 in FIG. 2 and/or to HNB device 302 in FIG. 3; HNB-GW 404 may correspond to HNB GW 212 in FIG. 2 and/or HNB GW 304 in FIG. 3; and SAS 406 may correspond to any of servers 140, 150 and 155 in FIG. 1 and/or to SAS 210 in FIG. 2. Here, the source HNB device 402 may establish a PCAP session with the SAS 406 through an exchange of messages with the HNB-GW 404 starting at stage 411 by sending a PUA: CONNECT message to the HNB-GW 404 containing a PCAP Context Id, PCAP packet data unit (PDU) and an indicator for the SAS 406. At stage 412, the recipient HNB-GW 404 may identify the target SAS 406 to which the PCAP PDU received at stage 411 will be routed and creates and maintains a mapping between the SCCP based signaling connection (e.g., between HNB-GW 404 and SAS 406) and the PUA based signaling connection (between source HNB device 402 and HNB-GW 404). At stage 413, the HNB-GW 404 establishes an SCCP connection to the SAS 406 (e.g. as set forth in 3GPP TS 25.450) by sending an SCCP Connection Request to SAS 406 containing the PCAP PDU received at stage 411. The target SAS 406 may process the received PCAP PDU and reply with a PCAP PDU response message (e.g. which may be transferred in an SCCP Connection Confirm). At stage 414, the recipient HNB-GW 404 may initiate a PUA: DIRECT TRANSFER message including the PCAP Context ID received at stage 411 and the PCAP PDU response message received at stage 413. A connection between source HNB device 402 and target SAS 406 may then be established for the specific signaling connection at stage 415 and possibly used to transfer more PCAP messages.

According to an embodiment, the message flow illustrated in FIG. 4 may be preceded by a series of messages between source HNB device 402 and HNB-GW 404 that enable source HNB device 402 to know in advance that the message flow in FIG. 4 can be supported by HNB-GW 404 (e.g., that HNB-GW 404 supports transfer of PCAP messages using PUA). This series of messages may occur as part of the initialization of source HNB device 402 (e.g., soon after HNB device 402 is powered on for the first time by a user or by a network operator in a situation where the HNB device 402 has connectivity to an HMS and an HNB-GW as shown in FIG. 2 for example).

Figure 5:
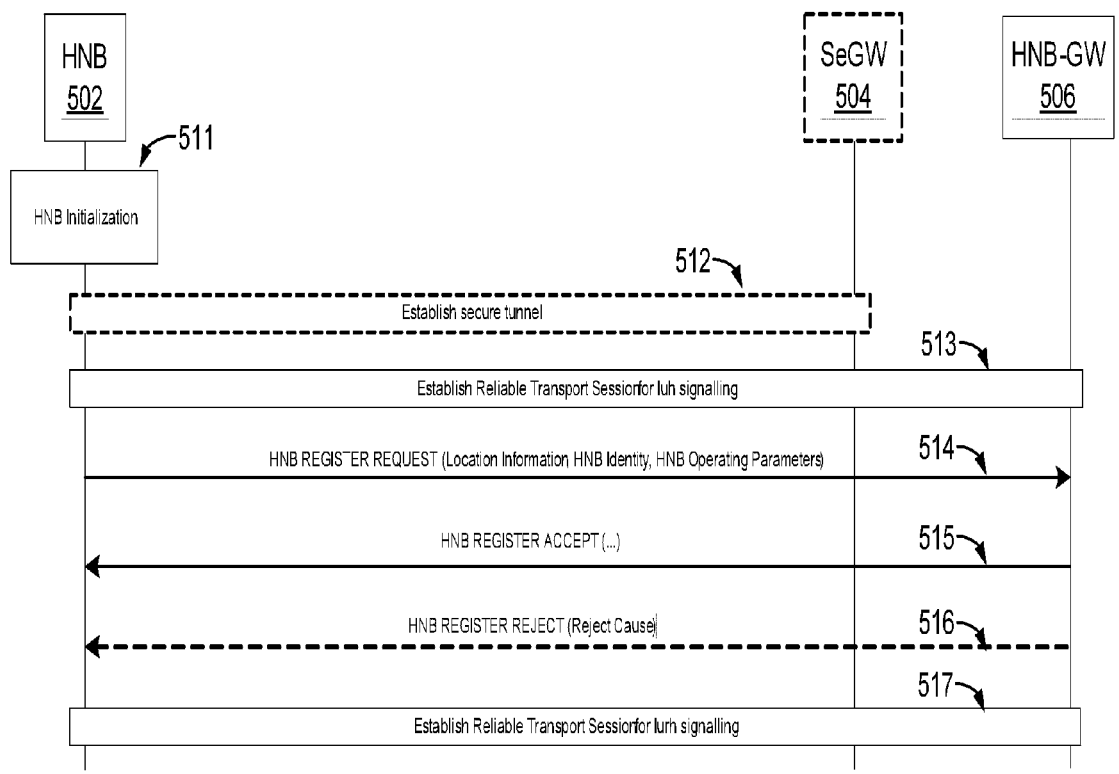
FIG. 5 is a message flow diagram showing an exchange of messages in a process for discovery of HNB-GW location support capabilities according to an embodiment.

An example implementation of the aforementioned embodiment is shown in FIG. 5 wherein HNB device 502 may correspond to source HNB device 402 in FIG. 4 and HNB 204 in FIG. 2; HNB-GW 506 may correspond to HNB-GW 404 in FIG. 4 and HNB GW 212 in FIG. 2; and security gateway (SeGW) 504 may correspond to SeGW 208 in FIG. 2. At stage 511, HNB device 502 starts to perform initialization (e.g. after being powered on by or otherwise instructed by a user or operator) and may connect to an HMS (not shown in FIG. 5) and obtain the address or identity of HNB-GW 506. At stage 512, HNB device 502 establishes a secure communications tunnel to security gateway 504. At stage 513, HNB device 502 may establish a reliable transport session over the Iuh interface with HNB-GW 506. At stage 514, HNB device 502 sends a Home Node B Application Part (HNBAP) HNB REGISTER REQUEST message to HNB GW 506 in order to register for normal HNB operation with HNB GW 506. The HNB REGISTER REQUEST message may include parameters needed for registration such as a location estimate for HNB device 502, an identity of the HNB device 502 and HNB operating parameters. In this embodiment, the HNB REGISTER REQUEST message also includes a first parameter, referred to herein as an "HNB PUA Support Indicator", indicating that HNB device 502 supports or may support PUA and/or that HNB device 502 desires to know the PUA capability of HNB-GW 506. HNB-GW 506 may respond with either an HNBAP HNB REGISTER ACCEPT message at stage 515 or an HNBAP HNB REGISTER REJECT message at stage 516. If HNB-GW 506 responds with the HNB REGISTER ACCEPT message at stage 515, a reliable transport session may be established between HNB device 502 and HNB-GW 506 at stage 517. In this embodiment, in response to the HNB REGISTER REQUEST message at stage 514 that includes an HNB PUA Support Indicator, HNB-GW 506 may include a parameter in the HNB REGISTER ACCEPT message at stage 515, referred to herein as an "HNB-GW PUA Support Indicator" indicating whether or not the HNB GW 506 supports PUA and is connected to an SAS (e.g. an SAS corresponding to SAS 406 in FIG. 4 and/or SAS 210 in FIG. 2). The HNB-GW PUA Support Indicator may further indicate characteristics of any SAS, each SAS or all SASs to which HNB-GW 506 may be connected such as their local IDs in PUA, the positioning methods supported and the types of positioning request that are supported (e.g. all types, emergency positioning requests, non-emergency positioning requests, high accuracy positioning requests, low accuracy positioning requests). In the event that HNB-GW 506 does not support PUA, is not connected to an SAS or does not recognize the HNB PUA support indicator in the HNB REGISTER REQUEST message, HNB-GW 506 may not include the HNB-GW PUA Support Indicator in the HNB REGISTER ACCEPT message at stage 515 or may include the HNB-GW PUA Support Indicator indicating that the HNB-GW does not or will not support PUA. Should HNB-GW 506 include the HNB-GW PUA Support Indicator at stage 515 indicating that PUA is supported and that HNB-GW 506 is connected to an SAS, HNB device 502 my later invoke positioning of a UE or of itself by initiating a PCAP session with an SAS via HNB-GW 506—e.g. as exemplified in FIG. 4.

Figure 6:
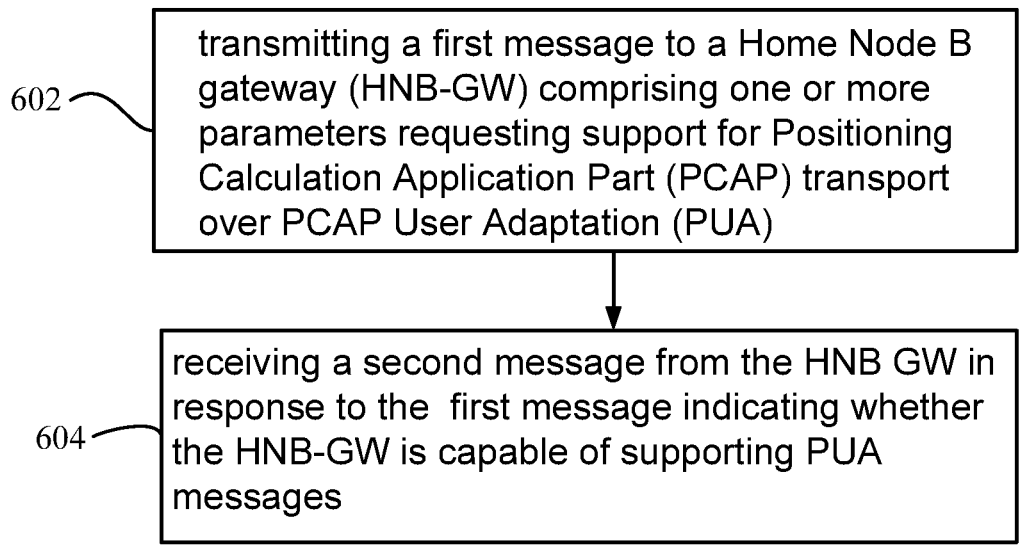
FIG. 6 is a flow diagram of a process for interacting with an HNB-GW to determine a capability for supporting Positioning Calculation Application Part (PCAP) User Adaption (PUA) messages according to an embodiment.
Figure 7:
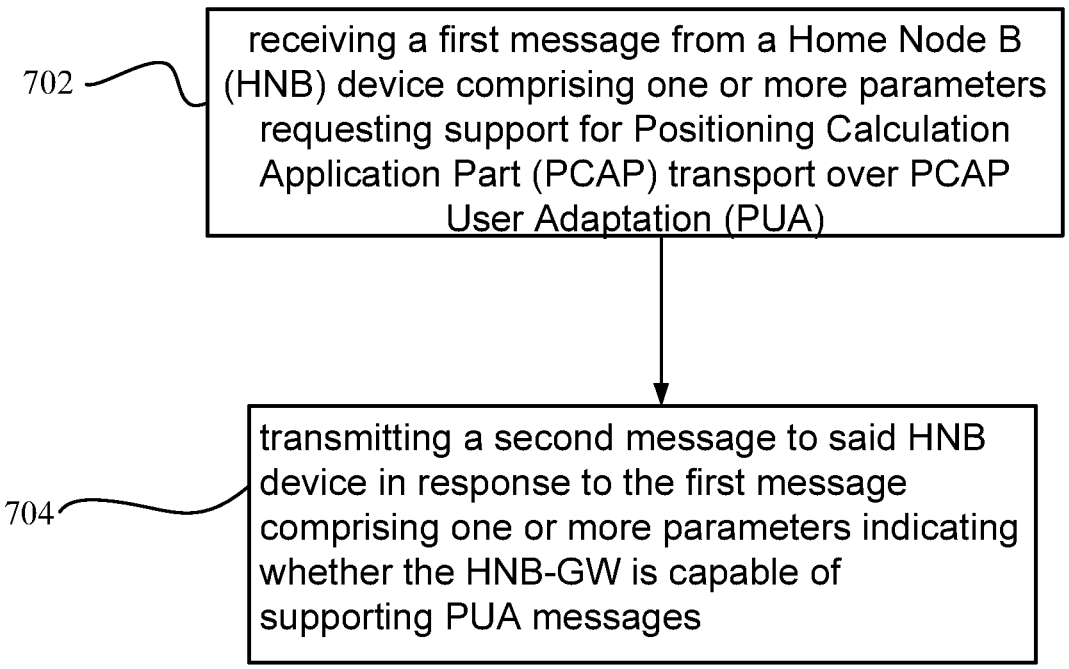
FIG. 7 is a flow diagram of a process for interacting with an HNB to indicate a capability of supporting PUA messages according to an embodiment.

FIGS. 6 and 7 illustrate interactions between an HNB device and an HNB-GW in establishing a capability of the HNB-GW to support PUA messages according to some embodiments. As pointed out above, in a particular implementation these actions may be performed following establishment of a secure tunnel between the HNB device and the HNB-GW. According to an embodiment, during HNB initialization an HNB device may engage in a message exchange to register itself with an HNB-GW (e.g., using the HNBAP message exchange described in association with FIG. 5) and to allow the HNB device to discover whether the HNB-GW supports PUA.

At block 602, an HNB device (e.g. which may correspond to HNB device 502 in FIG. 5) may transit a first message to the HNB-GW (e.g. which may correspond to HNB-GW 506 in FIG. 5) comprising one or more parameters requesting support for PCAP transport over PUA. The first message transmitted at block 602, for example, may be received at a recipient HNB-GW at block 702. In this context "support for PCAP transport over PUA" is an ability to transfer PCAP messages between an HNB device and an SAS, using PUA transport between the HNB device and the HNG-GW, in the course of performing or supporting a positioning operation. For example, as discussed above, such PCAP messages may comprise positioning assistance data transmitted from the SAS to the HNB device (e.g., to be provided to a UE). Similarly, such PCAP messages may comprise positioning measurements or a location estimate (e.g., obtained at a UE) transmitted from an HNB device to an SAS. In addition, such PCAP messages may comprise a request from an SAS to an HNB device for location related measurements (e.g. RTT and/or S/N) to be (i) made by the HNB device for a UE served by the HNB device and/or (ii) obtained by the HNB device from the UE. Such PCAP messages may further comprise one or more of such requested measurements returned by the HNB device to the SAS. It should be understood, however, that these are merely examples of features that may be supported in association with PCAP transport over PUA, and that claimed subject matter is not limited in this respect.

As illustrated above in FIG. 5 at stage 514, in a particular implementation this first message may comprise an HNB REGISTER REQUEST message specifying an identity and possibly a location of the HNB device and including a first parameter indicating that the HNB device supports or may support PUA and/or that the HNB device desires to know the PUA capability of the HNB-GW. In a particular implementation, the first parameter may be an HNB PUA Support Indicator. Thus, if the HNB device wishes to use PCAP transport over PUA with the HNB-GW, it may include the HNB PUA Support Indicator in the HNB REGISTER REQUEST message. In an embodiment, the HNB PUA Support Indicator may not be included in an HNB REGISTER REQUEST message and instead an HNB GW may proceed as if the HNB PUA Support Indicator was included in any HNB REGISTER REQUEST that is received from an HNB device and may provide the HNB GW capability to support or not support PUA in an HNB REGISTER ACCEPT response to the HNB device. It should be understood, however, that different messages may be used for the first message and that claimed subject matter is not limited to the use of HNB REGISTER REQUEST messages.

In response to receipt of a first message transmitted at block 602 and received at block 702, the HNB-GW may transmit a second message at block 704 to the HNB device comprising one or more parameters indicating whether the HNB-GW is capable of supporting PUA messages. The second message may be received, for example, at block 604 by the HNB device. As illustrated above in FIG. 5 at stage 515, in a particular implementation this second message may comprise an HNB REGISTER ACCEPT messages indicating one or more capabilities of the HNB-GW and including a second parameter indicating whether or not the HNB GW supports PUA and is connected to an SAS. In another particular embodiment, an HNB REGISTER ACCEPT message may further comprise one or more parameters indicating available location servers. For example, the one or more parameters indicating available location servers may comprise server identifiers or server identifications of specific location servers, and particular positioning methods supported by each such location server. It should be understood, however, that different types of messages may be used for the second message and that claimed subject matter is not limited to the use of HNB REGISTER ACCEPT messages.

In a particular implementation, an HNB REGISTER ACCEPT message transmitted from an HNB-GW at block 704 may comprise an optional element HNB-GW PUA Support Indicator if the HNB-GW supports PCAP transfer via PUA (e.g., such as shown in FIG. 4). Here, if the HNB-GW supports PUA functionality and is willing to provide PUA support to a newly registered HNB, the HNB-GW may respond to receipt of the HNB PUA Support Indicator (e.g., in a HNB REGISTER REQUEST message received at block 702) by including the HNB-GW PUA Support Indicator in a HNB REGISTER ACCEPT message transmitted at block 704. In an embodiment, even if the HNB-GW supports PUA, the HNB-GW may choose not to provide the HNB-GW Support indicator if there is no available Iupc interface to a SAS. If the HNB-GW does not recognize the HNB PUA Support Indicator received in an HNB REGISTER REQUEST message, does not support PUA, has no SAS available or for other reasons is unwilling or unable to support PUA for a requesting HNB, the HNB-GW may not include the HNB-GW PUA Support Indicator in an HNB REGISTER ACCEPT message (e.g., transmitted at block 704) or may include an indication that PUA will not be supported.

According to an embodiment, if an HNB receives a registration response message including the HNB-GW PUA Support Indicator (e.g., in an HNB REGISTER ACCEPT message received at block 604), the HNB may consider that an HNB-GW supports PCAP transport over PUA. The HNB may then initiate PCAP transactions over PUA if needed (e.g., as shown in FIG. 4). If the HNB does not receive an HNB-GW PUA Support Indicator at block 604 or receives an indication that the HNB-GW does not support PUA at block 604, the HNB may assume the HNB-GW does not support PUA transfer and may refrain from invoking PCAP positioning via the HNB-GW (e.g., may refrain from invoking messages shown in FIG. 4).

By following this process, the HNB device may discover whether it is able to initiate PCAP transactions with an SAS via an HNB-GW without configuration (e.g. from an HMS) or trial-and-error. This may be accomplished in a simple manner at the HNB registration process as discussed above. Different gateways may have different capabilities, and it is not expected that the HNB would know a-priori whether to use the PUA signaling. Further, even if the HNB-GW has the right capability, it may not have an operational connection to an SAS, which is also supported by the exchange exemplified in FIGS. 5-7 (e.g., no response is sent by an HNB-GW).

Particular implementations described above (e.g. in association with FIGS. 5-7) may have little or no impact on a legacy HNB-GW (e.g. pre-3GPP release 12), and may have only a minor impact on an HNB-GW that is not legacy (e.g. 3GPP Release 12 or later) that does not support PUA. In the first case (i.e., for a legacy HNB-GW), the HNB-GW may not understand the HNB PUA Support Indicator, and therefore it may respond (e.g., with transmitting an HNBAP: HNB REGISTER ACCEPT message) without including the HNB-GW PUA Support Indicator. In the second case, the HNB-GW may read the HNB PUA Support Indicator in the HNB REGISTER REQUEST message transmitted from the HNB, but simply not include its own indicator (e.g., acting the same as a legacy HNB-GW). From an HNB device perspective, the HNB-GW behavior may appear the same in both cases.

Another advantage of particular implementations that support FIGS. 5-7 is that an HNB-GW may return other information to an HNB (e.g., in the HNBAP: HNB REGISTER ACCEPT) such as the number of SASs that may be available via the HNB-GW, their local IDs and the positioning capabilities supported by the SAS, or by each SAS. An HNB-GW may further return a reserved identification comprising an International Mobile Subscriber Identity (IMSI) or an International Mobile Equipment Identity (IMEI) value to an HNB that the HNB may include in certain PCAP messages sent to an SAS to request different types of location support. The PCAP messages in which the reserved IMSI or IMEI value may be included may comprise: (i) a PCAP Position Calculation Request message sent by an HNB to request calculation of the location of a UE or of the HNB by an SAS; (ii) a PCAP Information Exchange Initiation Request sent by an HNB to request provision of assistance data from an SAS to support positioning of a UE or of the HNB; and (iii) a PCAP Position Initiation Request sent by an HNB to request invocation of one or more position methods by the SAS to help position a UE or the HNB. The reserved IMSI or IMEI value may identify to the SAS that the PCAP message sent by the HNB was (A) sent by an HNB (e.g. to position a UE) or (B) sent by an HNB to position or help position the HNB itself rather than to position or help position a mobile station or UE. In some implementations, the particular interpretation of the reserved IMSI or IMEI value (e.g. whether (A) or (B) above is implied) may be fixed and standardized (e.g. by 3GPP) and may be known to both an HNB and SAS.

In an alternative implementation, an HNB device may be informed of the HNB-GW capability to support PCAP transfer and PUA and/or the SAS configuration for an HNB-GW by Operations, Administration, Maintenance and Provisioning (OAM&P) systems (e.g., from an HNB management system (HMS)). A configuration server for the HNB (e.g., an HMS) may then need to be in communication with any configuration server for the HNB-GW (including regarding updates due to configuration changes, SAS connection changes, etc.) in order to configure correct and up to date information regarding HNB-GWs in HNBs.

In another alternative implementation, trial-and-error may be used by an HNB device to determine the PUA capability of an HNB-GW as described earlier herein whereby the HNB sends PUA messages to an HNB-GW, in order to find out whether responses are forthcoming, and thus whether or not the HNB-GW supports PUA. Since PUA messages may be lost for many reasons, however, this may be an unreliable technique for determining whether an HNB-GW supports PUA and may lead to loading problems for an HNB-GW if many HNBs are invoking the same solution. In addition, invoking this technique may delay a response by an HNB for UE positioning requests sent by an MSC or SGSN. Moreover, a legacy HNB-GW may ignore any received PUA message since the PUA protocol may not be recognized by the HNB-GW. In addition, an HNB-GW that supports PUA but has no operational SAS may or may not respond to a received PUA message from an HNB (e.g., may respond with a PUA error indication). Furthermore, lack of response by an HNB-GW to a PUA request from an HNB may be due to the specifics of the request rather than to lack of transport, and the HNB may try again. Overall, an implementation using trial-and-error may entail a more complex design of the discovery mechanism in the HNB.

Figure 8:
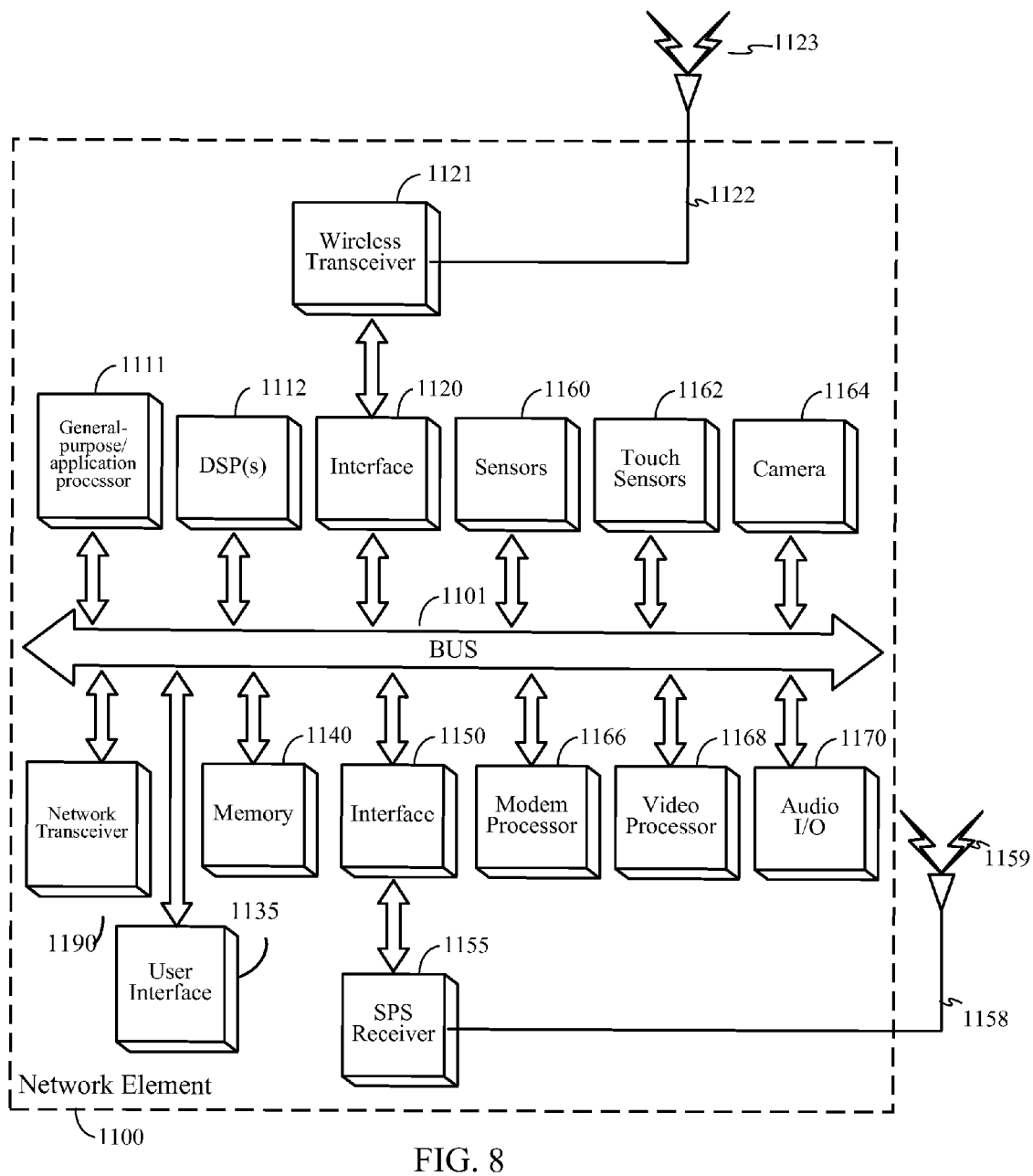
FIG. 8 is a schematic block diagram illustrating an exemplary device, in accordance with an implementation.

FIG. 8 is a schematic diagram of a network element 1100. The network element 1100 may be an HNB, which may correspond to femtocell 110 in FIG. 1, an HNB as in FIGS. 2, 3, 4 and 5 or an HNB performing the process of FIG. 6, according to an embodiment. The network element 1100 may also be an HNB-GW, which may correspond to an HNB-GW as in FIGS. 2, 3, 4 and 5 or to an HNB-GW performing the process of FIG. 7, according to an embodiment. Network element 1100 may include one or more features of an HNB or HNB-GW (e.g., providing an HNB device or HNB-GW device) depicted and described in association with FIGS. 2-7. In certain embodiments, network element 1100 may comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to corresponding multiple wireless communication standards such as, for example, versions of IEEE Std. 802.11, CDMA, WCDMA, LTE, UMTS, GSM, AMPS, Zigbee and Bluetooth, just to name a few examples. Wireless transceiver 1121 may enable network element 1100 to communicate wirelessly with one or more UEs—e.g. may enable network element 1100 to act as HNB by supporting one or more UEs.

Network element 1100 may also comprise a Satellite Positioning System (SPS) receiver 1155 capable of receiving and acquiring SPS signals 1159 via SPS antenna 1158. SPS receiver 1155 may also process, in whole or in part, acquired SPS signals 1159 for estimating a location of network element 1100. In some embodiments, general-purpose processor(s) 1111, memory 1140, DSP(s) 1112 and/or specialized processors (not shown) may also be utilized to process acquired SPS signals, in whole or in part, and/or calculate an estimated location of network element 1100, in conjunction with SPS receiver 1155. Storage of SPS or other signals (e.g., signals acquired from wireless transceiver 1121) for use in performing positioning operations may be performed in memory 1140 or registers (not shown). In that case, general-purpose processor(s) 1111, memory 1140, DSP(s) 1112 and/or specialized processors may provide or support a positioning function for use in processing measurements to estimate a location of network element 1100 or a location of a UE served by network element 1100 (e.g. in the case that network element 1100 is an HNB device such as HNB device 402 or 502).

FIG. 8 also shows that network element 1100 may comprise a network transceiver 1190. Network transceiver 1190 may be connected to an external network (e.g. corresponding to network 130 in FIG. 1) by one or more links (not shown in FIG. 8) that may enable communication of network element 1100 with other remote entities such as an SAS by wireline means. As an example a network element 1100 corresponding to an HNB may communicate with another network element 1100 corresponding to an HNB-GW via a network (e.g. the Internet) that is accessed by each network element 1100 via the respective network transceivers 1190. Network transceiver 1190 may also or instead be connected to one or more links that enable direct communication with one or more other entities (e.g. not via a network).

Also shown in FIG. 8, network element 1100 may comprise digital signal processor(s) (DSP(s)) 1112 connected to the bus 1101 (e.g. directly or by a bus interface 1110), general-purpose processor(s) 1111 connected to the bus 1101 (e.g. directly or by a bus interface 1110) and memory 1140. Bus interface 1110 may be integrated with the DSP(s) 1112, general-purpose processor(s) 1111 and memory 1140. In various embodiments, functions may be performed in response to execution of one or more machine-readable instructions stored in memory 1140 such as on a computer-readable storage medium, such as RAM, ROM, PROM, FLASH, or disc drive, just to name a few example. For example, the one or more instructions may enable network element 1100 to perform one or more of the embodiments described in association with FIGS. 4-8. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 8, a user interface 1135 may comprise any one of several devices such as, for example, a speaker, microphone, display device, keyboard, and touch screen, just to name a few examples. User interface 1135 may instead be supported via TCP/IP or other means to a remote user (e.g. a user accessing an HMS). In a particular implementation, user interface 1135 may enable a user or an OAM&P system such as an HMS to interact with one or more applications hosted on network element 1100. For example, devices of user interface 1135 may store analog or digital signals on memory 1140 to be further processed by DSP(s) 1112 or general purpose processor 1111 in response to an action from a user. Similarly, applications hosted on network element 1100 may store analog or digital signals on memory 1140 to present an output signal to a user.

Network element 1100 may also comprise environment sensors 1160, such as for example, temperature sensors, barometric pressure sensors, ambient light sensors, camera imagers, microphones, just to name few examples. Sensors 1160 may generate analog or digital signals that may be stored in memory 1140 and processed by DPS(s) 1112 or general purpose application processor 1111 in support of one or more applications such as, for example, applications directed to positioning or navigation operations. Sensors 1160 may be used to help determine the location of network element 1100 and/or to provide information to an HMS, SAS or UE to assist in determining location of UEs.

In a particular implementation, network element 1100 may comprise a dedicated modem processor 1166 capable of performing baseband processing of signals received and down converted at wireless transceiver 1121 or SPS receiver 1155. Similarly, modem processor 1166 may perform baseband processing of signals to be up converted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

It should be noted not all components shown in FIG. 8 and described above may necessarily be present. For example, a network element 1100 that corresponds to an HNB-GW may not have a wireless transceiver 1121, antennas 1122 and 1158 and/or an SPS receiver 1155.

Figure 9:
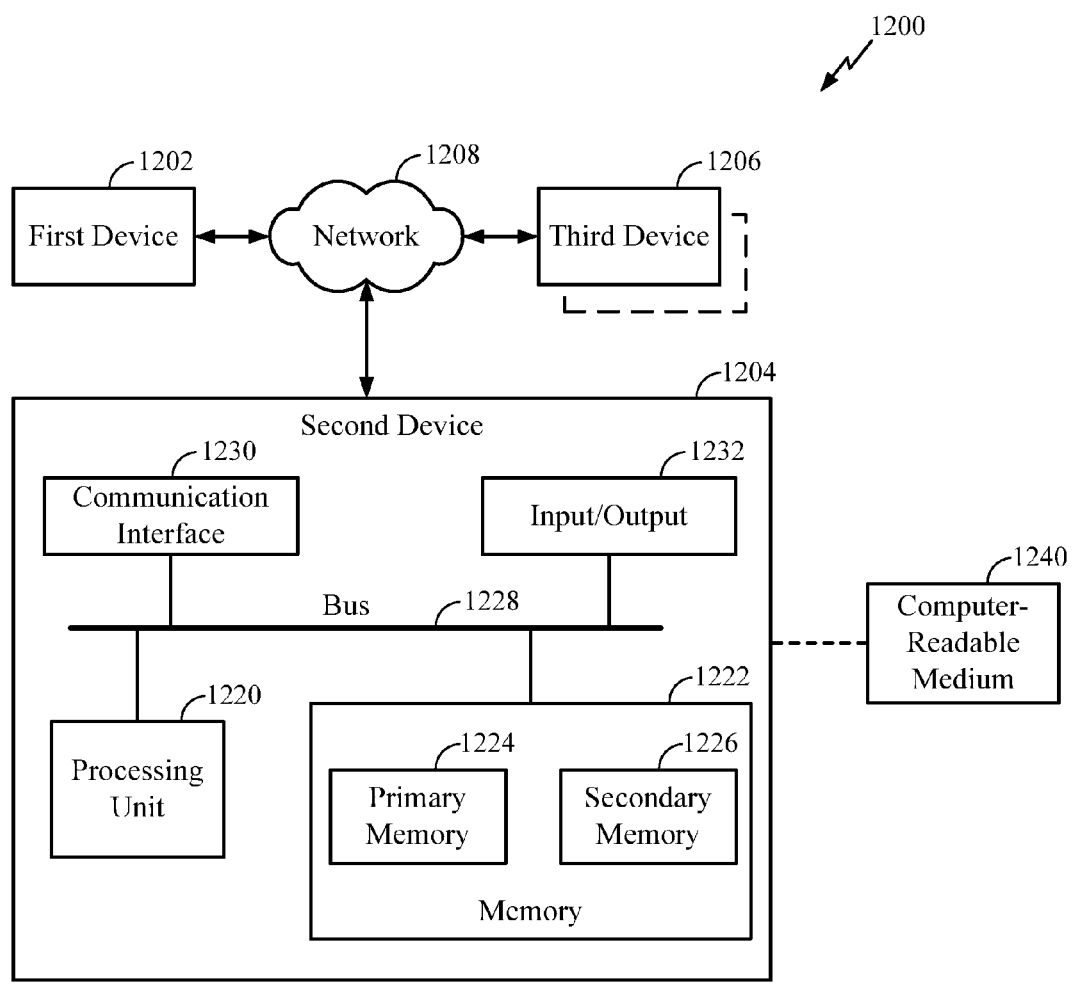
FIG. 9 is a schematic block diagram of an example computing platform in accordance with an implementation.

FIG. 9 is a schematic diagram illustrating an example system 1200 that may include one or more devices configurable to implement techniques or processes described above, for example, in connection with FIGS. 1-7. System 1200 may include, for example, a first device 1202, a second device 1204, and a third device 1206, which may be operatively coupled together through a wireless communications network 1208. In an aspect, first device 1202 may comprise a server such as an SAS (e.g. SAS 210 in FIG. 2 or SAS 406 in FIG. 4) capable of providing positioning assistance data such as, for example, a base station almanac, and/or providing other positioning support using PCAP. Also, in an aspect, wireless communications network 1208 may comprise one or more wireless access points, for example, and may correspond to network 130 in FIG. 1. However, claimed subject matter is not limited in scope in these respects. Second device 1204 may comprise an HNB-GW (e.g., as in FIGS. 2-5) and third device 1206 may comprise an HNB (e.g., as in FIGS. 2-5)

First device 1202, second device 1204 and third device 1206, as shown in FIG. 9, may further be representative of any device, appliance or machine (e.g., such as local transceiver 115, cellular transceiver 112, servers 140, 150 or 155 as shown in FIG. 1 or HNB or HNB-GW in FIGS. 2-5) that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, a femtocell, or a mobile device in accordance with the examples described herein.

Similarly, wireless communications network 1208 may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, a digital map of an indoor area may be stored in a particular format in memory 1222. Processing unit 1220 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area.

Secondary memory 1226 may include, for example, the same or similar type of memory as primary memory 1224 or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1230 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband CDMA ("WCDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and WCDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") or WCDMA cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a femtocell transceiver device comprising a Home Node B (HNB), comprising:
   transmitting, via a communication interface, a first message to an HNB gateway (HNB-GW) comprising one or more parameters requesting support for Positioning Calculation Application Part (PCAP) transport over PCAP User Adaption (PUA), wherein said PUA is a communications procedure to transmit PCAP messages between said HNB and said HNB-GW to conduct positioning transactions between said HNB and a Standalone Serving Mobile Location Center (SAS) via said HNB-GW; and
   receiving, at said communication interface, a second message from said HNB GW in response to said first message indicating whether said HNB-GW is capable of supporting PUA messages to verify that said HNB-GW is capable of transferring PCAP positioning messages between said HNB and said SAS.

2. The method of claim 1, wherein said second message indicates that said HNB-GW does not support PUA messages.

3. The method of claim 2, wherein said second message does not comprise parameters related to PUA support.

4. The method of claim 1, wherein said first message comprises a Home Node B Application Part (HNBAP) HNB REGISTER REQUEST message.

5. The method of claim 1, wherein said second message comprises an HNBAP HNB REGISTER ACCEPT message.

6. The method of claim 1, wherein said second message comprises one or more parameters indicating that said HNB-GW is capable of supporting PUA messages.

7. The method of claim 6, and further comprising commencing transmitting, via said communication interface, PUA messages to said HNB-GW based, at least in part, on said one or more parameters indicating that said HNB-GW is capable of supporting PUA messages.

8. The method of claim 5, wherein said HNBAP HNB REGISTER ACCEPT message further comprises one or more parameters indicating available location servers.

9. The method of claim 8, wherein said one or more parameters indicating said available location servers comprise a server identification, and a list of positioning methods supported by each server.

10. The method of claim 5, wherein said HNBAP HNB REGISTER ACCEPT message further comprises a reserved International Mobile Subscriber Identity (IMSI) value or a reserved International Mobile Equipment Identity (IMEI) value to be used by said HNB in at least one positioning operation.

11. The method of claim 10, wherein said at least one positioning operation comprises determination of a location estimate for a user equipment device.

12. The method of claim 10, wherein said at least one positioning operation comprises determination of a location estimate for said HNB.

13. The method of claim 10, wherein said at least one positioning operation comprises providing positioning assistance data.

14. The method of claim 10, and further comprising transmitting, via said communication interface, a PCAP Position Calculation Request message to said HNB-GW including said reserved IMSI or IMEI value.

15. The method of claim 10, and further comprising transmitting, via said communication interface, a PCAP Information Exchanging Initiation Request message to said HNB-GW including said reserved IMSI or IMEI value.

16. The method of claim 10, and further comprising transmitting, via said communication interface, a PCAP Position Initiation Request message to said HNB-GW including said reserved IMSI or IMEI value.

17. A femtocell transceiver device configured as a Home Node B (HNB) device, comprising:
   a network adapter to transmit messages to and receive messages from a data communication network; and
   one or more processors to:
   initiate transmission, via said network adapter, of an first message to an HNB gateway (HNB-GW) comprising one or more parameters requesting support for Positioning Calculation Application Part (PCAP) transport over PCAP User Adaption (PUA) wherein said PUA is a communications procedure to transmit PCAP messages between said HNB and said HNB-GW to conduct positioning transactions between said HNB and a Standalone Serving Mobile Location Center (SAS) via said HNB-GW; and
   obtain an second message received at said network adapter from said HNB GW in response to said first message indicating whether said HNB-GW is capable of supporting PUA messages to verify that said HNB-GW is capable of transferring PCAP positioning messages between said HNB and said SAS.

18. The femtocell transceiver device of claim 17, wherein said second message indicates that said HNB-GW does not support PUA messages.

19. The femtocell transceiver device of claim 18, wherein said second message does not comprise parameters related to PUA support.

20. The femtocell transceiver device of claim 17, wherein said first message comprises a Home Node B Application Part (HNBAP) HNB REGISTER REQUEST message.

21. The femtocell transceiver device of claim 17, wherein said second message comprises an HNBAP HNB REGISTER ACCEPT message.

22. The femtocell transceiver device of claim 17, wherein said second message comprises one or more parameters indicating that said HNB-GW can support PUA messages.

23. The femtocell transceiver device of claim 22, wherein said one or more processors are further to initiate commencement of transmission, via said network adapter, of PUA messages to said HNB-GW based, at least in part, on said one or more parameters indicating whether said HNB-GW can support PUA messages.

24. The femtocell transceiver device of claim 22, wherein said second message further comprises a reserved International Mobile Subscriber Identity (IMSI) or a reserved International Mobile Equipment Identity (IMEI) value to indicate support of one or more positioning operations.

25. The femtocell transceiver of claim 24, wherein at least one of said one or more positioning operations comprise computation of a location estimate.

26. The femtocell transceiver of claim 24, wherein at least one of said one or more positioning operations comprise providing positioning assistance data.

27. The femtocell transceiver of claim 24, wherein said one or more processors are further to initiate transmission a PCAP Position Calculation Request message through said network adapter to said HNB-GW including said IMSI or IMEI value.

28. The femtocell transceiver of claim 24, wherein said one or more processors are further to initiate transmission of a PCAP Information Exchanging Initiation Request message through said network adapter to said HNB-GW including said IMSI or IMEI value.

29. The femtocell transceiver of claim 24, wherein said one or more processors are further to initiate transmission of a PCAP Position Initiation Request message through said network adapter to said HNB-GW including said IMSI or IMEI value.

30. A femtocell transceiver device configured as a Home Node B (HNB) device, comprising:
   means for transmitting an first message to an HNB gateway (HNB-GW) comprising one or more parameters requesting support for Positioning Calculation Application Part (PCAP) transport over PCAP User Adaption (PUA), wherein said PUA is a communications procedure to transmit PCAP messages between said HNB and said HNB-GW to conduct positioning transactions between said HNB and a Standalone Serving Mobile Location Center (SAS) via said HNB-GW; and
   means for receiving an second message from said HNB GW in response to said first message indicating whether said HNB-GW is capable of supporting PUA messages to verify that said HNB-GW is capable of transferring PCAP positioning messages between said HNB and said SAS.

31. A non-transitory storage medium comprising machine-readable instructions stored thereon which are executable by a special purpose computing apparatus of a femtocell transceiver device configured as a Home Node B (HNB) to:
   initiate transmission of a first message to an HNB gateway (HNB-GW) comprising one or more parameters requesting support for Positioning Calculation Application Part (PCAP) transport over PCAP User Adaption (PUA), wherein said PUA is a communications procedure to transmit PCAP messages between said HNB and said HNB-GW to conduct positioning transactions between said HNB and a Standalone Serving Mobile Location Center (SAS) via said HNB-GW; and
   obtain a second message received from said HNB GW in response to said first message indicating whether said HNB-GW is capable of supporting PUA messages to verify that said HNB-GW is capable of transferring PCAP positioning messages between said HNB and said SAS.

32. A method comprising, at a Home Node B gateway (HNB-GW), comprising:
   receiving, at a communication interface, a first message from a Home Node B (HNB) device comprising one or more parameters requesting support for Positioning Calculation Application Part (PCAP) transport over PCAP User Adaption (PUA), wherein said PUA is a communications procedure to transmit PCAP messages between said HNB and said HNB-GW to conduct positioning transactions between said HNB and a Standalone Serving Mobile Location Center (SAS) via said HNB-GW; and
   transmitting, via said communication interface, a second message to said HNB device in response to said first message comprising one or more parameters indicating whether said HNB-GW is capable of supporting PUA messages to verify that said HNB-GW is capable of transferring PCAP positioning messages between said HNB and said SAS.

33. The method of claim 32, wherein said one or more parameters indicating whether said HNB-GW can support PUA messages comprises an HNB-GW PUA Support Indicator.

34. The method of claim 32, and further comprising receiving, at said communication interface, PUA messages from said HNB device based, at least in part, on said one or more parameters indicating whether said HNB-GW can support PUA messages.

35. The method of claim 32, wherein said second message further comprises a reserved International Mobile Subscriber Identity (IMSI) value or a reserved International Mobile Equipment Identity (IMEI) value to be used by said HNB in support of one or more positioning operations.

36. The method of claim 35, wherein at least one of said one or more positioning operations comprise computation of a location estimate.

37. The method of claim 35, wherein at least one of said one or more positioning operations comprise providing positioning assistance data.

38. The method of claim 35, and further comprising receiving, at the communication interface, a PCAP Position Calculation Request message from said HNB device including said reserved IMSI or IMEI value.

39. The method of claim 35, and further comprising receiving, at the communication interface, a PCAP Information Exchanging Initiation Request message from said HNB device including said reserved IMSI or IMEI value.

40. The method of claim 35, and further comprising receiving, at the communication interface, PCAP Position Initiation Request message from said HNB device including said reserved IMSI or IMEI value.

41. The method of claim 32, wherein said first message comprises a Home Node B Application Part (HNBAP) HNB REGISTER REQUEST message.

42. The method of claim 32, wherein said second message comprises an HNBAP HNB REGISTER ACCEPT message.

43. A Home Node B gateway (HNB-GW) device, comprising:
   a network adapter to transmit messages to and receive messages from a data communication network; and
   one or more processors to:
      obtain a first message received at said network adapter from a Home Node B (HNB) device comprising one or more parameters requesting support for Positioning Calculation Application Part (PCAP) transport over PCAP User Adaptation (PUA), wherein said PUA is a communications procedure to transmit PCAP messages between said HNB and said HNB-GW to conduct positioning transactions between said HNB and a Standalone Serving Mobile Location Center (SAS) via said HNB-GW; and
      initiate transmission of a second message through said network adapter to said HNB device in response to said first message comprising one or more parameters indicating whether said HNB-GW is capable of supporting PUA messages to verify that said HNB-GW is capable of transferring PCAP positioning messages between said HNB and said SAS.

44. The HNB-GW device of claim 43, wherein said one or more parameters indicating whether said HNB-GW can support PUA messages comprises an HNB-GW PUA Support Indicator.

45. The HNB-GW device of claim 43, wherein said one or processors are further to obtain PUA messages received at said network adapter from said HNB device based, at least in part, on said one or more parameters indicating whether said HNB-GW can support PUA messages.

46. The HNB-GW device of claim 43, wherein said second message further comprises a reserved International Mobile Subscriber Identity (IMSI) value or a reserved International Mobile Equipment Identity (IMEI) value to be used by said HNB in support of one or more positioning operations.

47. The HNB-GW device of claim 46, wherein at least one of said one or more positioning operations comprise computation of a location estimate.

48. The HNB-GW device of claim 46, wherein at least one of said one or more positioning operations comprise providing positioning assistance data.

49. The HNB-GW device of claim 46, wherein said one or more processors are further to obtain a PCAP Position Calculation Request message received at said network adapter from said HNB device including said reserved IMSI or IMEI value.

50. The HNB-GW device of claim 46, wherein said one or more processors are further to obtain a PCAP Information Exchanging Initiation Request message received at said network adapter from said HNB device including said reserved IMSI or IMEI value.

51. The HNB-GW device of claim 46, wherein said one or more processors are further to obtain and further comprising receiving PCAP Position Initiation Request message from said HNB device including said reserved IMSI or IMEI value.

52. A Home Node B gateway (HNB-GW) device, comprising:
    means for receiving a first message from a Home Node B (HNB) device comprising one or more parameters requesting support for Positioning Calculation Application Part (PCAP) transport over PCAP User Adaptation (PUA), wherein said PUA is a communications procedure to transmit PCAP messages between said HNB and said HNB-GW to conduct positioning transactions between said HNB and a Standalone Serving Mobile Location Center (SAS) via said HNB-GW; and
    means for transmitting a second message to said HNB device in response to said first message comprising one or more parameters indicating whether said HNB-GW is capable of supporting PUA messages to verify that said HNB-GW is capable of transferring PCAP positioning messages between said HNB and said SAS.

53. A non-transitory storage medium comprising machine-readable instructions stored thereon, which are executable by one or more processors of a Home Node B gateway (HNB-GW) to:
    obtain a first message received from a Home Node B (HNB) device comprising one or more parameters requesting support for Positioning Calculation Application Part (PCAP) transport over PCAP User Adaptation (PUA), wherein said PUA is a communications procedure to transmit PCAP messages between said HNB and said HNB-GW to conduct positioning transactions between said HNB and a Standalone Serving Mobile Location Center (SAS) via said HNB-GW; and
    initiate transmission of a second message to said HNB device in response to said first message comprising one or more parameters indicating whether said HNB-GW is capable of supporting PUA messages to verify that said HNB-GW is capable of transferring PCAP positioning messages between said HNB and said SAS.

* * * * *